UNITED STATES PATENT OFFICE.

ROBSON DUNWODY, OF KIRKWOOD, GEORGIA.

PROCESS OF DISTILLING TURPENTINE FROM CRUDE PINE-GUMS OF VARIOUS AGES.

1,055,149. Specification of Letters Patent. Patented Mar. 4, 1913.

No Drawing. Application filed March 11, 1911. Serial No. 613,934.

*To all whom it may concern:*

Be it known that I, ROBSON DUNWODY, a citizen of the United States, residing at Kirkwood, in the county of Dekalb and State of Georgia, have invented certain new and useful Improvements in Processes of Distilling Turpentine from Crude Pine-Gums of Various Ages; and I do hereby declare the following to be a full, clear, and exact description of the invention, such as will enable others skilled in the art to which it appertains to make and use the same.

This invention relates to processes of distilling turpentine from crude pine gums of various ages, and has for its object to produce a procedure which will get the turpentine out of the gums in a quicker, more efficient, and more rational manner than the methods heretofore proposed.

It is now well known that in order to obtain a good quality of rosin it is necessary that it should not become charred or carbonized, and in the distillation of crude pine gums, the free or uncombined water and lighter oils first come over very readily, beginning to distil off at about, say, 212° F. Then as the temperature is raised, the volatile oils will come off until the temperature of say, about 275° F. is reached, when the water which is intimately mingled, and possibly chemically combined with the rosin, will be distilled off. If now, the heat is not checked as by the addition of water to the still, the temperature will rise very rapidly until it reaches say, 316° F., when carbonization will begin, and thereby so discolor the rosin as to render the product of a much lower grade than would otherwise be the case. It is further well known that in dealing with crude pine gums in general, if water is added to the still at about 260° F., and the temperature is permitted to gradually rise until it reaches about 306° F., a good quality of rosin may be obtained. I have discovered however, that in dealing with virgin gum, or that which has been collected from a tree during its first year of scarification, the point of distillation at which its inherent water is given off is very different from the point at which the inherent water will be given off from gum which has been collected from the tree during the second year of scarification. And in the same way I have found that the temperature during distillation at which the gum which was collected during the third year of scarification will give up its entrained water is different still from the temperature at which the first and second year gums will give up their entrained water. In other words, I have found that if the first, second and third year, as well as other gums, are all treated alike, and on the supposition that they all give up the water inherent in them at about the same temperature, a great deal of time is unnecessarily lost during distillation, and therefore, the process of obtaining turpentine may be very materially cheapened if the procedure now to be disclosed is followed.

Accordingly, my invention consists in the novel steps and combinations of steps for treating first, second, third, and later year gums in the process of distilling off their contained turpentine, all of which will be more fully hereinafter disclosed, and particularly pointed out in the claim. That is to say, I have observed that virgin gum dipped in March, April and May will part with substantially all of its inherent water during distillation at or about 230° F., so that water should be added to the still in order to keep the temperature from rising too suddenly in dealing with said gum when about 230° F. has been reached. On the other hand, if this first year virgin gum has been dipped from June to July, it will not part with its inherent water until about 240° F. has been reached, and therefore, water should be added to the still when dealing with said last mentioned gum when this latter temperature has been reached. Further, I have discovered that if this first year virgin gum has been dipped after July it will part with its water at or about 250° F., and consequently, water should be admitted to the still to prevent an undue rise of temperature in dealing with this last mentioned gum when the thermometer shows a temperature of about 250° F. On the other hand, if what it known as yearling gum, or gum which has been taken from the tree during its second year of scarification is being subjected to a distillation process, its inherent water will adhere more tenaciously than in the case of the virgin gum, and I have found that if it was collected during March, April or May, its entrained water will be substantially all gone when a temperature of about 260° F. has been reached in the still. On the other hand, if this gum has been collected after the month of May, the temperature at which it loses its entrained water will gradually rise until about 270° F. has been reached in the still. Therefore, when dealing with this yearling gum, if an undue rise of temperature and consequent carbonization is not to take place, one should add water at 260° F. for those collections of gum made in March, April and May and should add the water at gradually increasing temperature up to say 270° F., when the collections have been made after May. The gum collected during the third year's scarification of a tree is called buck gum, and I have found that when this buck gum is collected during March, April and May it will have lost substantially all of its contained water when about 265° F. has been reached, and if it was collected later in the year, the point at which it has lost all of its water in the still will be about 275° F. It consequently follows that in dealing with buck gum, water should be added at temperatures of about 260° F. to 275° F., according to the time of year at which it was collected. There is still a fourth class of gum known as scrape which is the gum that adheres to the tree after the more fluid gum has descended into the collecting boxes, and which has therefore, had more or less of its volatile spirits taken from it by the action of the sun and weather. It is in a solidified condition, is often an inch or more in thickness and occurs in the first, second and third year of scarification, as well as in fact, the later years of scarification. This scrape is mechanically removed from the tree at the end of the season, but in removing it a considerable quantity of chips or woody material comes off with the resin, and upon examination, this wood is found to be thoroughly impregnated with the resinous materials, and to be of a light red color. Upon distilling scrape containing its woody constituents it is found, that unless special precautions are taken, the coloring matter of the wood will color the rosin and thereby make it of lower commerical value than would otherwise be the case. It is also found however, that the contained wood will not stain the rosin to an objectionable extent if the temperature is kept below say 275° F. probably owing to the fact that the acids or other staining matter in the wood are not liberated much below that temperature. It is therefore obvious that if these woody constituents can be removed from the rosin at or below 275° F., the value and grade of the product can be increased. As a matter of fact, in carrying out the process of distillation of scrape the wood is mechanically removed by means of scoop strainers or their equivalent, and since I have found that the said scrape is practically deprived of its inherent water when a temperature of 275° F. is reached, in carrying out my process I cause the said woody material to be removed; then I begin to add water to the said scrape. By removing the woody material at this point, rather than at some other point of temperature, the following advantages accrue:—In order to remove the woody material it is necessary to uncap the still, and if violent ebullition is taking place in the still while it is uncapped, a greater or less quantity of spirits will be present in the vapors driven from the still, and will therefore be lost. On the other hand, when the scrape has lost its water, ebullition has practically ceased, and therefore a minimum loss of volatile spirits is incurred if the uncapping takes place at about 275° F. In order to make clear the special advantages of distinguishing, (during the distillation operation,) between the different ages of the gum being distilled, it is only necessary to point out that according to the present procedure, it is known that all these gums can be successfully distilled if water is added in the neighborhood of say 260° F. It so happens that this temperature is a rough, mean temperature for the giving up of water by first, second and third year gums, and that, therefore, the addition of water at this point is a sort of compromise, which is found to be successful in practice. But if it is further considered that starting from the temperature of 212° F., when water begins to be liberated, to some extent, from all the various gums, and it is remembered that a point is soon reached at which, if one drives off more water, ebullition will cease and the temperature will rapidly rise if water is not added and will quickly pass the 316° F. point where carbonization starts, it will be seen at once that some intelligent idea of just what is taking place in the gum is necessary if distillation is to be successfully accomplished in the shortest possible time. For example—suppose one is working with first year or virgin gum, and ebullition has practically stopped soon after 230° F. is reached, the rapidly rising temperature will be very hard indeed to check, so that if one waits until 260° F. is reached before adding water, he will run considerable risk of the gum, or at least some portions of the same, rising to a much higher temperature, and of having some discoloration take place. All of this would, of course, be at once avoided if he added the water at 230° F. Again, suppose one is working with third year buck gum, and adds water to the still at 260° F., during the latter part of the season when the gum would normally give up its water at about 270° F., then unnecessary water will have been added and it will take longer to cook this water out of the still than would have been the case if the distiller had waited until say 270° F. or 275° F. had been reached, and had added water at that point. Although in practice some charges of gum will not incur as great a loss at times as will others, yet, especially if one is working on October gum, there will always be charges in the still in which the unnecessary loss of time will be considerable. In some cases this loss will amount to as much as two hours on each charge, or say six hours a day. It therefore follows that although the present method of adding water to all gums indiscriminately at a temperature of 260° F. is successful in practice, yet at the same time by carrying on the distilling operation in the light of the above disclosures a much more intelligent operation is had, and a much more certain and better grade of products is at all times produced.

It sometimes happens that a charge in the still consists of the first year, second year, and third year gum, and even sometimes scrape is mixed in with the charge. Or it also happens that first year and scrape, or second year and scrape, or third year and scrape are mixed in the charge. In all of these cases with the knowledge that the first year gum gives up its water at about 230° to 240° F., that the second year gum gives up its water at about 260° to 270° F., and that the third year gum and scrape give up their water at about 275° F., the operator may act with intelligence and add the water at just that point which will insure against carbonization, and will at the same time produce clear, unstained commercial products in the minimum of time.

Although those accustomed to the distillation of turpentine will be able to practise the invention from the foregoing disclosure, the following specific examples will make my process more clear the temperature being stated in degrees Fahrenheit:—Suppose one is dealing with virgin gum, and there is say 500 gallons or about 4600 pounds of this gum in the still, which was gathered in July or August. A good fire is built under the kettle—a fire such as six sticks of ordinary four foot cord wood produces—and it is allowed to burn for about ten minutes or until a temperature of 212° is reached in the still. The fire is now so regulated or maintained (the operator keeping his eye on the thermometer in the still) that the temperature increases say about one degree per minute. About ten sticks of cord wood kept in the furnace and added one at a time will generally for the charge above cause the temperature to rise at the desired rate. When the temperature has thus risen to about 240° in the still, a continuous stream of water should be introduced, and of a size to deliver about one gallon per minute. After the water enters, the fire is so regulated as to cause the temperature to rise about one degree per minute for fifteen minutes or until say 255° or 260° is reached. The firing after that is so regulated as to cause the temperature to rise about three tenths (.3) of a degree per minute for say thirty minutes, or until 265° or 270° has been reached. The next five degrees increase of temperature should be at the rate of about one tenth (.1) of a degree per minute, or in other words, it should take about 50 minutes for the temperature to rise from say 265° to 270° or from 270° to 275°, as the case may be. The temperature is next held between say 270° and 280° until the spirits show on the testing glass one-quarter of an inch or 5 per cent. distillation. This will require about 20 minutes more before the desirable proportion of spirits coming over has been reached. The temperature is next increased at the rate of about two degrees per minute for 10 or 15 minutes; then the water is cut off, the fire removed from under the kettle, and the charge turned out. Of course when the gum is gathered at a different time of year, or when it is a gum other than the virgin, or when there is a different amount of gum in the still, the above data would be somewhat changed, but those skilled in this art will have no difficulty with the aid of the above disclosure, in making the necessary allowances. For example, as is at present well known, the amount of water would vary for virgin gum no matter what time of the year it is gathered, but the same rate of increasing temperature and the same rate of adding water could be maintained no matter what amount of gum is in the kettle, while the time element of adding the water, and the time element of maintaining the temperature would vary in proportion to the amount of gum. That is to say, if, for example, 10 barrels of gum is being treated, as above described, the total time taken would be two hours and thirty minutes. 5 barrels of gum on the other hand, take only about one hour and fifteen minutes.

In practice of course suitable and now well known thermometers are placed in the still, and the temperature of the interior thereof is carefully and constantly noted, so that if the operator knows the character of his gum he can add water at just the right time to produce the most efficient results.

What I claim is:—

The process of distilling turpentine and recovering the highest grade rosin from virgin resinous gum, which consists in gradually adding water to said gum when said temperature has risen substantially to 240° F., substantially as described.

In testimony whereof, I affix my signature, in presence of two witnesses.

ROBSON DUNWODY.

Witnesses:
T. A. WITHERSPOON,
R. M. PARKER.